US012709290B2

(12) United States Patent
Rambourg et al.

(10) Patent No.: US 12,709,290 B2
(45) Date of Patent: Aug. 18, 2026

(54) USING STOW AND RAKE FOR ROAD DANGER MITIGATION ASSIST

(71) Applicant: Steering Solutions IP Holding Corporation, Saginaw, MI (US)

(72) Inventors: Juliette M. Rambourg, Lake Orion, MI (US); Zaki Ryne, Rochester Hills, MI (US); Lei Wang, Auburn Hills, MI (US); Farhad Bolourchi, Novi, MI (US); Mitchell G. McDowell, Clare, MI (US); Kyle F. Middaugh, Midland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 18/904,488

(22) Filed: Oct. 2, 2024

(65) Prior Publication Data

US 2026/0091798 A1 Apr. 2, 2026

(51) Int. Cl.
*B60W 50/14* (2020.01)
*B62D 1/183* (2006.01)

(52) U.S. Cl.
CPC ............. *B60W 50/14* (2013.01); *B62D 1/183* (2013.01); *B60W 2540/229* (2020.02); *B60W 2552/00* (2020.02)

(58) Field of Classification Search
CPC ........... B60W 50/14; B60W 2540/229; B60W 2552/00; B62D 1/183
See application file for complete search history.

(56) References Cited

U.S. PATENT DOCUMENTS

2019/0111945 A1* 4/2019 Wiegand .............. B60K 35/231

FOREIGN PATENT DOCUMENTS

| | | | | |
|---|---|---|---|---|
| DE | 102004027085 A1 | 12/2005 | | |
| DE | 102011002911 A1 | 7/2012 | | |
| DE | 102011117297 A1 | 5/2013 | | |
| DE | 102014 210494 A1 | 12/2015 | | |
| DE | 102018221136 A1 * | 6/2020 | ............. | B62D 1/183 |
| DE | 102021122259 A1 | 3/2023 | | |

OTHER PUBLICATIONS

German Examination Report dated May 21, 2026 corresponding to German Patent Application 102025140267, 12 pages.

* cited by examiner

*Primary Examiner* — Long T Tran
*Assistant Examiner* — Charles J Brauch
(74) *Attorney, Agent, or Firm* — Dickinson Wright PLLC

(57) ABSTRACT

A method for controlling a position of a steering wheel of a vehicle includes obtaining vehicle path data indicating a path of the vehicle, obtaining road condition data for roadways along the path of the vehicle, determining, based on the road condition data, whether hazardous road conditions are present on the roadways along the path of the vehicle, determining a state of a driver of the vehicle, determining, based on at least one of the determination of whether the hazardous road conditions are present and the state of the driver, whether to provide an alert to the driver; and, in response a determination to provide the alert to the driver, adjusting at least one of a stow position of the steering wheel and a rake position of the steering wheel.

20 Claims, 4 Drawing Sheets

USING STOW AND RAKE FOR ROAD DANGER MITIGATION ASSIST

TECHNICAL FIELD

This disclosure relates to cooperative vehicle operation.

BACKGROUND OF THE INVENTION

A vehicle, such as a car, truck, sport utility vehicle, crossover, mini-van, marine craft, aircraft, all-terrain vehicle, recreational vehicle, or other suitable forms of transportation, typically includes a steering system, such as an electronic power steering (EPS) system, a steer-by-wire (SbW) steering system, a hydraulic steering system, or other suitable steering system. The steering system of such a vehicle typically controls various aspects of vehicle steering including providing steering assist to an operator of the vehicle, controlling steerable wheels of the vehicle, and the like.

Increasingly, such vehicles are including or using advanced driver assistance systems that assist (e.g., autonomously or semi-autonomously) in one or more vehicle operations, such as vehicle steering and/or other vehicle operation. Under certain conditions, the driver of the vehicle and the advanced driver assistance system may cooperatively perform such vehicle operations.

SUMMARY OF THE INVENTION

This disclosure relates generally to driver prompting techniques for cooperative vehicle operation.

An aspect of the disclosed embodiments includes a method for controlling a position of a steering wheel of a vehicle includes obtaining vehicle path data indicating a path of the vehicle, obtaining road condition data for roadways along the path of the vehicle, determining, based on the road condition data, whether hazardous road conditions are present on the roadways along the path of the vehicle, determining a state of a driver of the vehicle, determining, based on at least one of the determination of whether the hazardous road conditions are present and the state of the driver, whether to provide an alert to the driver; and, in response a determination to provide the alert to the driver, adjusting at least one of a stow position of the steering wheel and a rake position of the steering wheel.

In other aspects, a system for controlling one or more steering functions of a vehicle is configured to perform the methods described herein. In other aspects, a processing device is configured to execute instructions stored in memory to control one or more steering functions of a vehicle as described herein.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
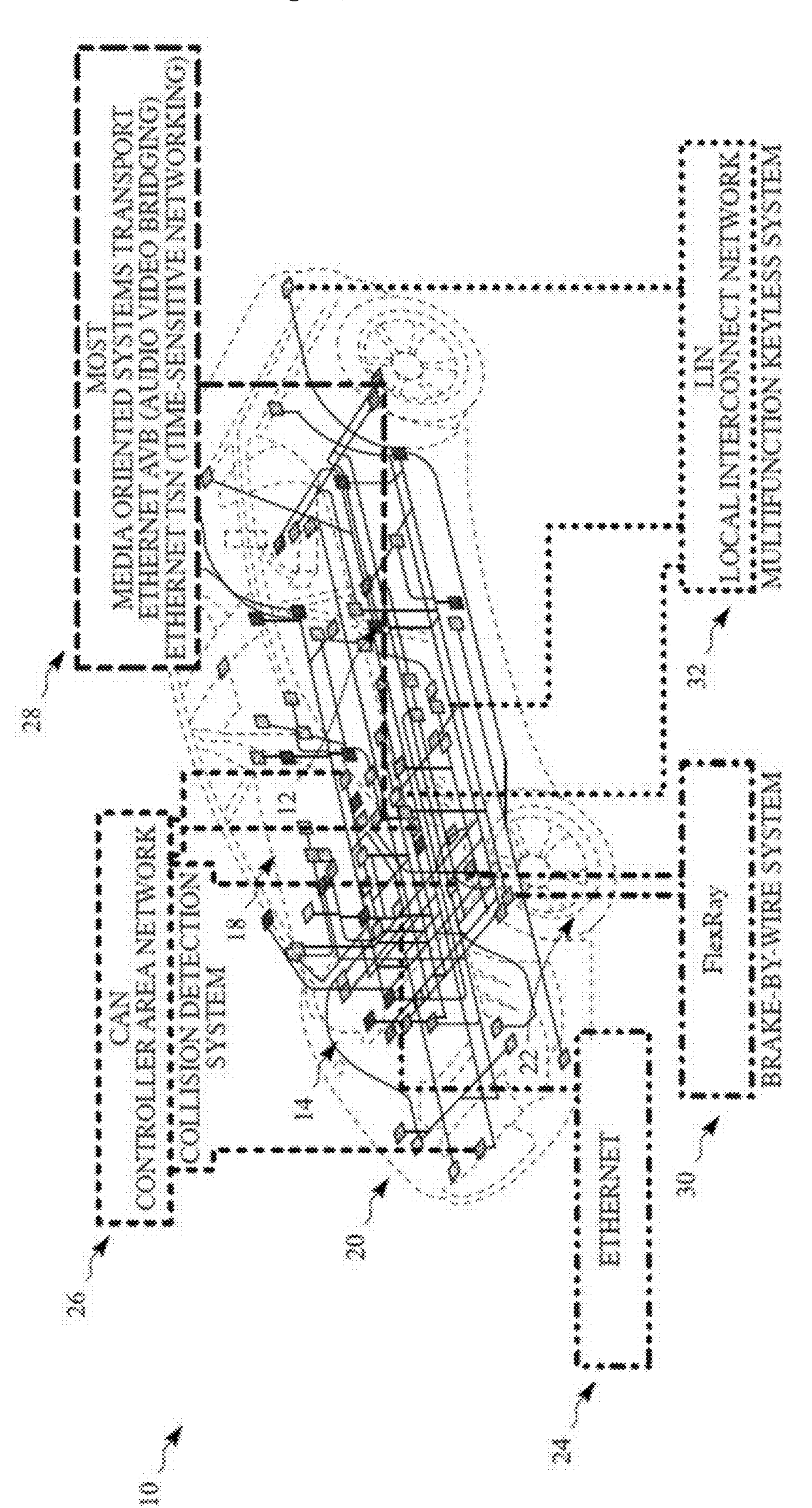
FIG. 1A generally illustrates a vehicle according to the principles of the present disclosure.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable forms of transportation, typically includes a steering system, such as an electronic power steering (EPS) system, a steer-by-wire (SbW) steering system, a hydraulic steering system, or other suitable steering system. The steering system of such a vehicle typically controls various aspects of vehicle steering including providing steering assist to an operator of the vehicle, controlling steerable wheels of the vehicle, and the like.

Some vehicles include or use advanced driver assistance systems (ADAS) that assist (e.g., autonomously or semi-autonomously) in one or more vehicle operations, such as vehicle steering and/or other vehicle operation. Under certain conditions, the driver of the vehicle and the advanced driver assistance system may cooperatively perform such vehicle operations. For example, drivers may be provided with real-time alerts (e.g., blind spot alerts, lane keeping assist alerts, obstacle alerts, etc.). However, drivers may not be provided with information about road conditions, obstacles in the roadway, etc. outside of satellite or other navigation system updates, which primarily target traffic-related information.

Further, a significant portion of drivers may deactivate various ADAS functions, including, but not limited to, adaptive speed functions, driver attention monitoring, lane keep assist, lane departure warning, automated emergency braking, forward collision warning, and traffic sign recognition functions. Some drivers may deactivate ADAS entirely or avoid using vehicles that implement ADAS.

Accordingly, road danger mitigation systems and methods according to the present disclosure are configured to provide drivers with targeted alerts about road conditions. More specifically, the systems and methods of the present disclosure are configured to provide targeted alerts in a manner that is minimally obtrusive while alerting drivers of challenging or hazardous driving conditions, such as snowy, icy, or otherwise slipper roads. In an example, alerts are provided by adjusting a steering wheel (referred to herein interchangeably with "handwheel") or steering column, such as by adjusting stow and/or rake positions of the steering wheel as described below in more detail. As used herein, the term "hazardous driving conditions" may be used generally to describe weather or environmental conditions, obstacles (e.g., objects in the road, poor road surface conditions or potholes), etc. In some examples, "hazardous driving conditions" may refer more specifically to slippery conditions caused by ice, snow, rain, etc. Further, in various examples described herein, the systems and methods of the present disclosure are responsive to driver state or status. As used herein, driver state or status may refer to, but is not limited to, various characteristics related to driver attentiveness, alertness, drowsiness, etc.

FIG. 1A generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel or handwheel, and other such components are disposed in the passenger compartment 18 of the vehicle 10. The propulsion controls may be actuated or controlled by an operator of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system, a steering-by-wire steering system (e.g., which may include or communicate with one or more controllers that control components of the steering system without the use of mechanical connection between the handwheel and wheels 22 of the vehicle 10), a hydraulic steering system (e.g., which may include a magnetic actuator incorporated into a valve assembly of the hydraulic steering system), or other suitable steering system.

The steering system may include an open-loop feedback control system or mechanism, a closed-loop feedback control system or mechanism, or combination thereof. The steering system may be configured to receive various inputs, including, but not limited to, a handwheel position, an input torque, one or more roadwheel positions, other suitable inputs or information, or a combination thereof.

Additionally, or alternatively, the inputs may include a handwheel torque, a handwheel angle, a motor velocity, a vehicle speed, an estimated motor torque command, other suitable input, or a combination thereof. The steering system may be configured to provide steering function and/or control to the vehicle 10. For example, the steering system may generate an assist torque based on the various inputs. The steering system may be configured to selectively control a motor of the steering system using the assist torque to provide steering assist to the operator of the vehicle 10.

Figure 1B:
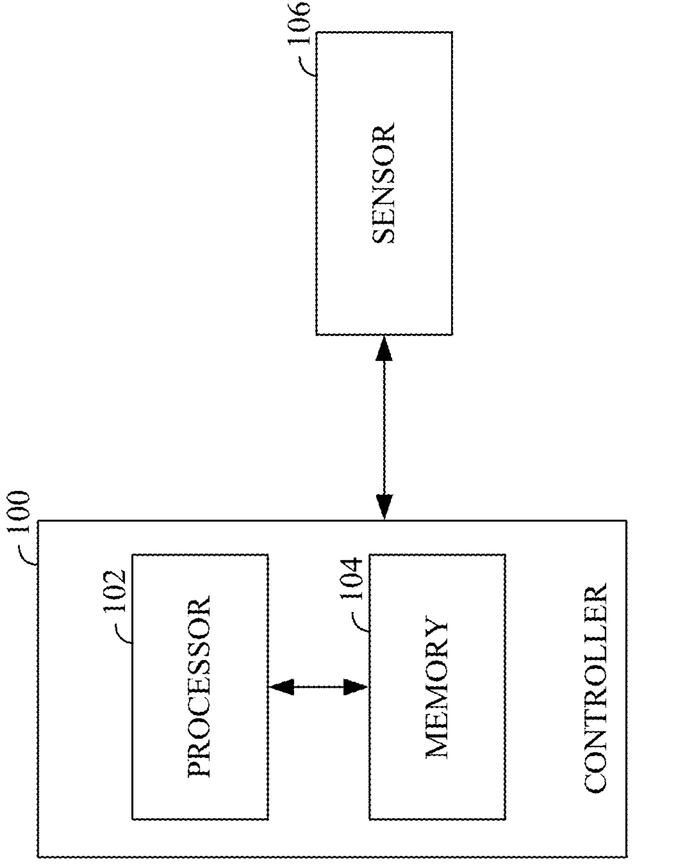
FIG. 1B generally illustrates a controller according to the principles of the present disclosure.

In some embodiments, the vehicle 10 may include a controller, such as controller 100, as is generally illustrated in FIG. 1B. The controller 100 may include any suitable controller, such as an electronic control unit or other suitable controller. The controller 100 may be configured to control, for example, the various functions of the steering system and/or various functions of the vehicle 10. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various aspects of the vehicle 10. Additionally, or alternatively, the memory 104 may include instructions that, when executed by the processor 102, cause the processor 102 to perform functions associated with the systems and methods described herein.

The controller 100 may receive one or more signals from various measurement devices or sensors 106 indicating sensed or measured characteristics of the vehicle 10. The sensors 106 may include any suitable sensors, measurement devices, and/or other suitable mechanisms. For example, the sensors 106 may include one or more torque sensors or devices, one or more handwheel position sensors or devices, one or more motor position sensor or devices, one or more position sensors or devices, other suitable sensors or devices, or a combination thereof. The one or more signals may indicate a handwheel torque, a handwheel angle, a motor velocity, a vehicle speed, other suitable information, or a combination thereof.

In some embodiments, the controller 100 may be configured to implement the road danger mitigation systems and methods of the present disclosure. However, the systems and methods described herein as implemented by the controller 100 are not meant to be limiting, and any type of software executed on a controller or processor can perform the methods described herein without departing from the scope of this disclosure. For example, a controller, such as a processor executing software within a computing device, can perform the methods described herein.

In an example, a controller is configured to adjust stow and/or rake positions of the steering wheel to provide alerts to the driver and/or receive steering/stow/rake feedback from the driver as described below in more detail. As used herein, "stow" refers to a telescope position of the steering wheel, such as a position along a longitudinal axis of a steering column (e.g., movement toward and/or away from the driver). In some contexts, various forms of the terms "stow" and "telescope" may be used interchangeably. Conversely, "rake" (which may correspond to a "rake angle") refers to an angular position of the steering wheel and/or steering column. For example, adjusting rake corresponds to adjusting an angle of the steering wheel relative to the chassis vertically upward or downward.

Figure 2:
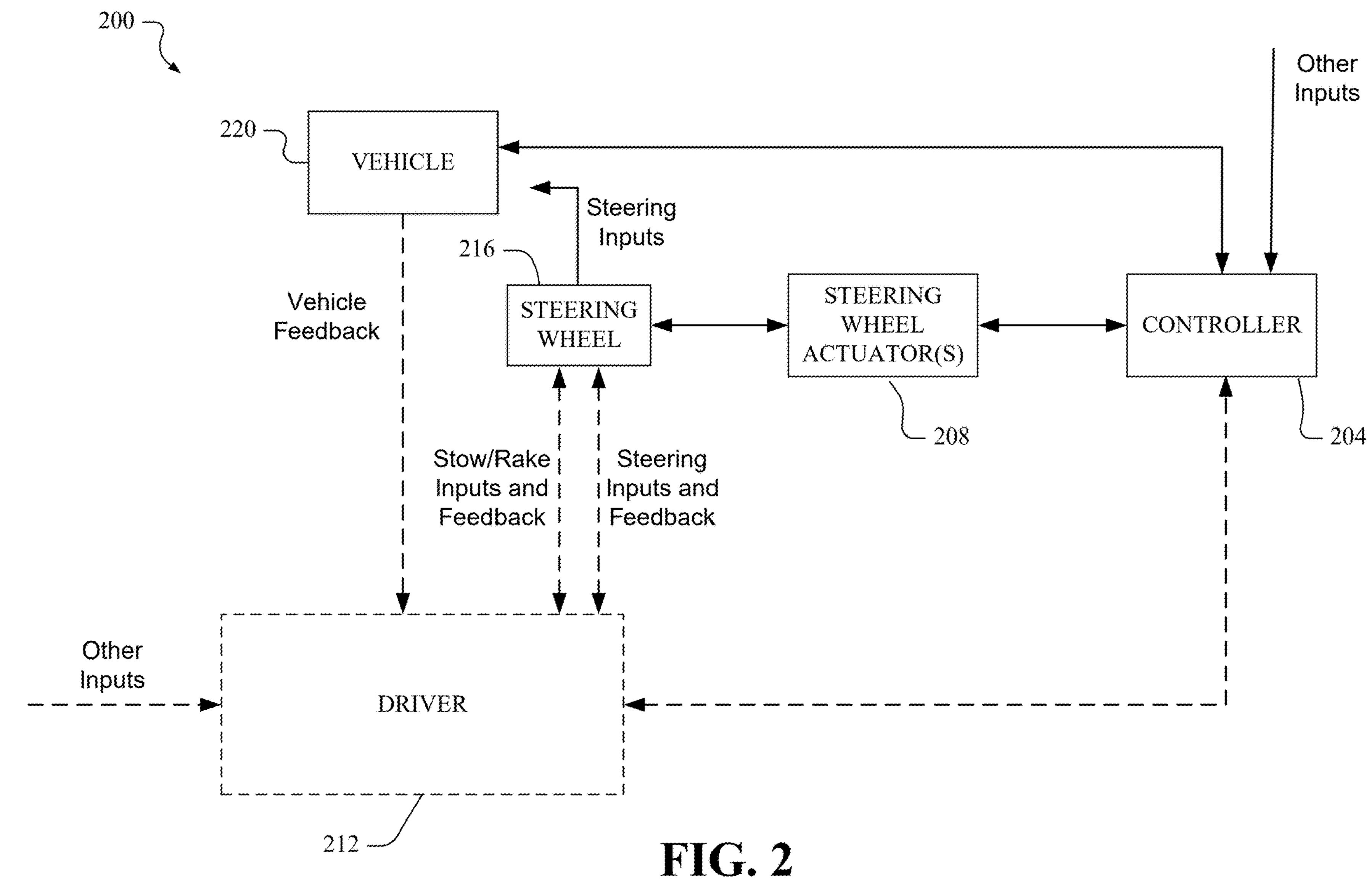
FIG. 2 generally illustrates an example road danger mitigation system according to the principles of the present disclosure.

FIG. 2 shows an example system (e.g., a road danger mitigation system) 200 according to the present disclosure. The system 200 includes a controller 204 configured to implement functions of a road danger mitigation system, including, but not limited to, controlling one or more steering wheel actuators 208 to alert a driver 212 (shown schematically in FIG. 2) in response to detecting various road conditions, obstacles, etc. The steering wheel actuators 208 include one or more actuators or actuator assemblies, motors, etc. configured to actuate a steering wheel 216 as described herein, including, but not limited to, adjusting stow and rake positions of the steering wheel 216.

In an example, the controller 204 is configured to adjust at least one of stow/telescope and rake positions of the steering wheel 216 in response to detecting various conditions, including, but not limited to, road, vehicle, weather, and driver conditions, characteristics, etc. Although described herein with respect to stow and rake positions, in some examples the controller 204 may be further configured to control other characteristics of the steering wheel 216 in accordance with the principles of the present disclosure, such as vibration, back and forth motion (i.e., tilt/angle in a horizontal or lateral direction), etc.

The controller 204 receives inputs such as sensed, measured, or estimated or calculated values from the steering wheel actuators 208, a vehicle 220, etc. Although components such as the controller 204, the steering wheel actuators 208, the steering wheel 216, etc. may be located within the vehicle 220, the vehicle 220 is shown separately in FIG. 2 to indicate signals/inputs corresponding more specifically to vehicle movement, control path, driving direction, and so on. For example, for various ADAS (and non-ADAS) functions, inputs indicating vehicle path and movement characteristics may be used to control vehicle steering, speed, braking, etc.

Conversely, the driver 212 may receive various signals and provide various outputs (shown in dashed lines in FIG. 2), including feedback from the vehicle 220, inputs to and from the steering wheel 216 (e.g., steering wheel inputs such as torque and angle, response to stow and rake movement, etc.), and various other inputs (e.g., reference inputs, such as vehicle track).

The steering wheel 216 is responsive to both driver inputs and inputs received from the steering wheel actuators 208 (e.g., inputs to control stow and rake movement, torque, such as a return to center torque, etc.). The steering wheel 216 (and/or the steering wheel actuators 208) provide, to the vehicle 220, various inputs corresponding to control of vehicle steering (e.g., a steering wheel angle).

To implement systems and methods according to the principles of the present disclosure, the controller 204 further receives the various inputs from the steering wheel actuators 208 and/or the steering wheel 216, the driver 212, the vehicle 220, etc., as well as one or more other inputs indicating road conditions, obstacles, and so on ("road condition data"). The one or more other inputs may include, but are not limited to, inputs received from satellite or navigation systems, weather inputs (e.g., from one or more vehicle sensors configured to sense weather, atmospheric, and/or road conditions, from a weather telematics system or network, etc.), inputs from vehicle systems/controllers configured to calculate or predict road conditions (e.g., based on other received or sensed inputs), and combinations thereof. In one example, the controller 204 detects and/or determines whether the roadway in the path of the vehicle (e.g., a current roadway or path, an upcoming roadway or path in a planned route, etc.) includes icy, snowy, or otherwise slippery conditions and selectively controls stow or rake and/or other characteristics of the steering wheel 216 to provide an alert to the driver 212.

In some examples, the controller 204 further receives inputs indicating a status of the driver 212, such as an indication of whether the driver's hands are on the steering wheel 216 (e.g., via one or more sensors associated with the steering wheel 216), an indication of drowsiness and/or inattentiveness (e.g., via one or more sensors, cameras, etc. positioned to monitor the driver 212), etc. In various examples, the controller 204 selectively controls the steering wheel actuators 208 further based on the inputs indicating the status of the driver 212, such as by modifying how the steering wheel actuators 208 are adjusted (e.g., modifying a rate, magnitude, or type of adjustment based on the status of the driver 212), selectively proceeding with or refraining from adjusting the steering wheel actuators 208 based on the status of the driver 212, etc.

In addition to providing alerts to the driver 212 by controlling the steering wheel actuators 208 as described herein, the controller 204 may be configured to control other types of alerts, including, but not limited to, audio alerts, visual alerts, vibration of the steering wheel or other haptic alerts, etc. Further, controlling the steering wheel actuators 208 may inherently include some level of audio feedback due to noises generated by the actuators 208 and/or associated motors.

Figure 3:
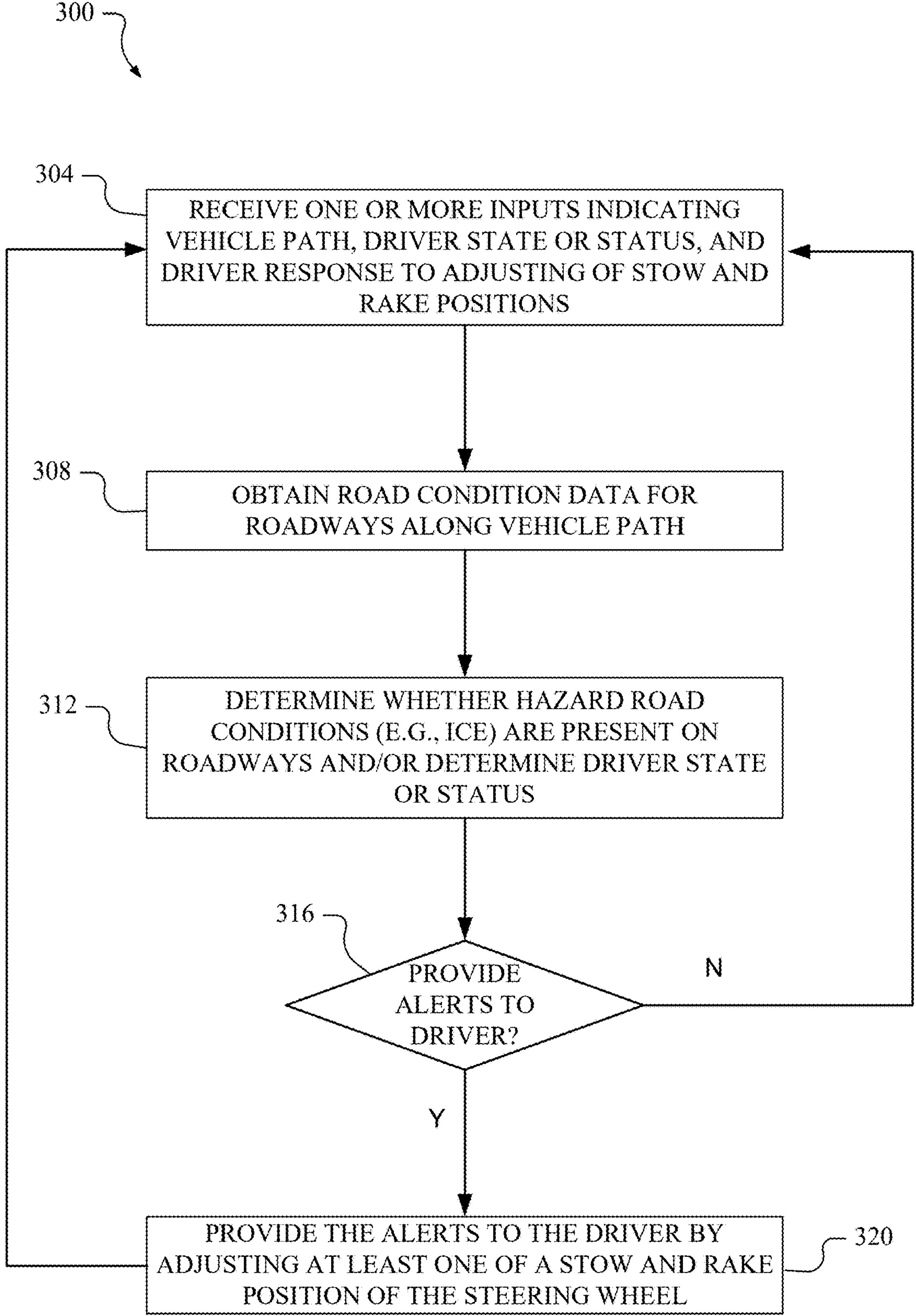
FIG. 3 is a flow diagram generally illustrating steps of an example road danger mitigation method according to the principles of the present disclosure.

FIG. 3 is a flow diagram generally illustrating a road danger mitigation method 300 according to the principles of the present disclosure. For example, one or more computing devices, processors or processing devices, etc. are configured to execute instructions to implement the method 300, such as one or more of the processors of the systems described herein (e.g., a computing device or processor of a vehicle configured to implement the system 200, the controller 204, etc.). One or more of the steps of the method 300 as described below may be skipped or omitted in some examples, and/or one or more of the steps may be performed in a different sequence than described.

At 304, the method 300 includes receiving one or more inputs indicating a vehicle path, route, etc. ("vehicle path data"), or one or more inputs indicating driver state or status (e.g., inputs indicating the driver's attentiveness, alertness, drowsiness, whether the driver is incapacitated, etc.) and/or one or more inputs indicating the driver's response to stow/rake movements. For example, the vehicle path may correspond to a roadway the vehicle is currently driving on, a roadway within a planned route of the vehicle, etc.

At 308, the method 300 includes receiving or obtaining road condition data for roadways along or otherwise associated with the vehicle path. The road condition data may include inputs received from satellite or navigation systems, weather inputs, inputs from vehicle systems/controllers configured to calculate or predict road conditions, etc. as described herein.

At 312, the method 300 includes determining, based on the road condition data and the vehicle path data, whether one or more hazardous road conditions are present on roadways along the vehicle path. In some example, the method 300 includes determining driver state or status as described herein (e.g., determining whether the driver is inattentive, incapacitated, unresponsive, etc.). In an example, determining whether the one or more hazardous road conditions are present may correspond to determining whether slippery road conditions are present. Determining whether the slippery road conditions (or, more specifically, icy road conditions) are present may include predicting the slippery road conditions are present based on a combination of sensed and received data, based on road condition data received from a weather telematics system, crowdsourced road condition data, etc. Determining the driver state or status may include determining whether the driver is asleep/inattentive and needs to be awakened/alerted. The method 300 may including determining whether the driver is asleep or otherwise inattentive based on a lack of steering inputs, the driver's hands not being on the steering wheel, inputs from a camera or other sensor, etc.

At 316, the method 300 includes determining, based on results of steps 304, 308, and 312 (e.g., the road condition data, the vehicle path data, the determination of whether hazardous road conditions are present, the driver state or status etc.) whether to provide one or more alerts to the driver regarding the hazardous road conditions, the driver state or status, or combinations thereof. For example, the method 300 may determine whether to provide the one or more alerts in response to a determination that the driver state or status incapacitated or otherwise unresponsive. As one example, the method 300 may provide the one or more alerts in response to a prediction of hazardous road conditions (e.g., specifically, icy road conditions) on the current roadway within one mile or one minute of a current location of the vehicle.

In some examples, the method 300 may determine whether to provide the one or more alerts further based on the status of the driver as described herein (e.g., based on a further determination that driver attentiveness is below a threshold, the driver is exhibiting signs of drowsiness, the driver's hands are not on the steering wheel, etc.)

In some examples, such as in an example autonomous driving scenario (e.g., were the driver's hands are not on the steering wheel), the method 300 may determine whether to provide the one or more alerts further based on a status of the ride or trip (e.g., a trip to an identified destination). For example, the method 300 may provide the one or more alerts in response to a determination that the driver is arriving at (e.g., within a predetermined time or distance of) the destination. In an example, the method 300 prompts the driver to take over control of the steering wheel by triggering stow/rake movements as described herein.

If the result of the determination of step 316 is true/yes, the method 300 proceeds to 320. If the result of the determination of step 316 is false/no, the method 300 proceeds to 304.

At 320, the method 300 provides the one or more alerts to the driver by adjusting at least one of a stow and rake position of the steering wheel. In some examples, adjusting the stow/rake position may include adjusting the steering wheel from a first stow/rake position to a second stow rake position. In other examples, adjusting the stow/rake position may include toggling or alternating between two or more positions (e.g., back and forth between first and second positions, from a first position to a second position and then from the second position to a third position, etc.). In still other examples, adjusting the stow/rake position may include adjusting both the stow position and the rake position, either sequentially (e.g., adjusting the stow position and then the rake position or vice versa) or simultaneously, alternating between adjusting the stow position and adjusting the rake position, adjusting the stow position from a first position to a second position while adjusting the rake position alternately upward and downward (e.g., "wiggling" the steering wheel upward and downward) or vice versa, and so on.

In still other examples, adjusting the steering wheel may include adjusting the steering wheel further based on results of one or more of steps 304, 308, 312, and 316. For example, one type of adjustment (e.g., stow position) may be performed in response to a determination that icy conditions are detected while another type of adjustment (e.g., rake position) may be performed in response to a determination that snowy conditions are detected. In other examples, the stow/rake position may be adjusted based on a determination of whether the driver's hands are on the steering wheel (e.g. by providing an adjustment having a lower frequency, magnitude, rate of movement, etc. in response to a determination that the driver's hands are on the steering wheel and providing an adjustment having a greater frequency, magnitude, rate of movement, etc. in response to a determination that the driver's hands are not on the steering wheel). Similar adjustments may be based on a predicted severity of hazardous road conditions, level of driver attentiveness or drowsiness, etc.

In still another example, the first position and the second position may correspond to one or more predetermined positions, driver preferred positions, etc. For example, the first position may correspond to a driver selected position for comfort, driving preferences, etc. (either for hands-off automated or cooperative driving or hands-on driving) while the second position corresponds to a predetermined position for driving in hazardous conditions (which can be driver selected or adjustable), such as a predetermined position for driving in icy conditions, snowy conditions, etc.

In some examples, the adjustments to the stow/rake position may be correlated to specific driver actions or desired actions, such as an indication to slow the vehicle or prepare to brake (e.g., by adjusting the stow position toward the driver), to adjust posture (e.g., by adjusting the rake position upward), and so on.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for providing an alert to a driver by controlling a position of a steering wheel of a vehicle, the method comprising:

obtaining vehicle path data indicating a path of the vehicle;

obtaining road condition data for roadways along the path of the vehicle;

determining, based on the road condition data, whether hazardous road conditions are present on the roadways along the path of the vehicle;

determining a state of the driver;

determining, based on at least one of (i) the determination of whether the hazardous road conditions are present and (ii) the state of the driver, whether to provide the alert to the driver; and in response a determination to provide the alert to the driver, adjusting at least one of a stow position of the steering wheel and a rake position of the steering wheel, wherein the adjusting includes causing movement of the steering wheel to provide the alert to the driver.

2. The method of claim 1, further comprising determining a response of the driver to the adjusting of the at least one of the stow position and the rake position.

3. The method of claim 1, wherein adjusting the stow position includes telescoping the steering wheel inward away from the driver or outward toward the driver.

4. The method of claim 1, wherein adjusting the rake position includes adjusting a rake angle of the steering wheel upward or downward.

5. The method of claim 1, wherein determining whether the hazardous road conditions are present includes determining whether ice is present on the roadways, the method further comprising adjusting the at least one of the stow position and the rake position in response to a determination that the ice is present on the roadways.

6. The method of claim 1, wherein adjusting the at least one of the stow position and the rake position includes adjusting the at least one of the stow position and the rake position from a first position to a second position.

7. The method of claim 1, wherein adjusting the at least one of the stow position and the rake position includes adjusting the at least one of the stow position and the rake position from a first position to a second position and from the second position to a third position.

8. The method of claim 1, wherein adjusting the at least one of the stow position and the rake position includes adjusting the at least one of the stow position and the rake position from a first position to a second position and from the second position back to the first position.

9. The method of claim 1, further comprising adjusting the at least one of the stow position of the steering wheel and the rake position of the steering wheel further based on a determination of a distance or driving time of the hazardous road conditions from a current position of the vehicle.

10. A system for providing an alert to a driver by controlling a position of a steering wheel of a vehicle, the system comprising:

a controller configured to obtain vehicle path data indicating a path of the vehicle, obtain road condition data for roadways along the path of the vehicle, determine, based on the road condition data, whether hazardous road conditions are present on the roadways along the path of the vehicle, determine a state of the driver, determine, based on at least one of (i) the determination of whether the hazardous road conditions are present and (ii) the state of the driver, whether to provide the alert to the driver, and in response a determination to provide the alert to the driver, generate an output configured to adjust at least one of a stow position of the steering wheel and a rake position of the steering wheel; and at least one actuator configured to, responsive to the output of the controller, adjust the at least one of the stow position and the rake position, wherein the adjusting includes causing movement of the steering wheel to provide the alert to the driver.

11. The system of claim 10, wherein the controller is further configured to determine a response of the driver to the adjusting of the at least one of the stow position and the rake position.

12. The system of claim 10, wherein adjusting the stow position includes telescoping the steering wheel inward away from the driver or outward toward the driver.

13. The system of claim 10, wherein adjusting the rake position includes adjusting a rake angle of the steering wheel upward or downward.

14. The system of claim 10, wherein determining whether the hazardous road conditions are present includes determining whether ice is present on the roadways, the controller further configured to generated the output in response to a determination that the ice is present on the roadways.

15. The system of claim 10, wherein adjusting the at least one of the stow position and the rake position includes adjusting the at least one of the stow position and the rake position from a first position to a second position.

16. The system of claim 10, wherein adjusting the at least one of the stow position and the rake position includes adjusting the at least one of the stow position and the rake position from a first position to a second position and from the second position to a third position.

17. The system of claim 10, wherein adjusting the at least one of the stow position and the rake position includes adjusting the at least one of the stow position and the rake position from a first position to a second position and from the second position back to the first position.

18. The system of claim 10, further comprising adjusting the at least one of the stow position of the steering wheel and the rake position of the steering wheel further based on a determination of a distance or driving time of the hazardous road conditions from a current position of the vehicle.

19. A processing device configured to execute instructions stored in memory to provide an alert to a driver by controlling a position of a steering wheel of a vehicle, the instructions comprising:

obtaining vehicle path data indicating a path of the vehicle;

obtaining road condition data for roadways along the path of the vehicle;

determining, based on the road condition data, whether hazardous road conditions are present on the roadways along the path of the vehicle;

determining a state of the driver;

determining, based on at least one of (i) the determination of whether the hazardous road conditions are present and (ii) the state of the driver, whether to provide the alert to the driver; and in response a determination to provide the alert to the driver, adjusting at least one of a stow position of the steering wheel and a rake position of the steering wheel, wherein the adjusting includes causing movement of the steering wheel to provide the alert to the driver.

20. The processing device of claim 19, wherein the instructions further comprise determining a response of the driver to the adjusting of the at least one of the stow position and the rake position.

* * * * *